(12) United States Patent
Lindoff et al.

(10) Patent No.: US 8,705,440 B2
(45) Date of Patent: Apr. 22, 2014

(54) METHOD AND APPARATUS FOR CELL SEARCHING

(75) Inventors: Bengt Lindoff, Bjärred (SE); Johan Nilsson, Höllviken (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 638 days.

(21) Appl. No.: 12/354,052

(22) Filed: Jan. 15, 2009

(65) Prior Publication Data

US 2010/0177683 A1     Jul. 15, 2010

(51) Int. Cl.
    *H04W 4/00*     (2009.01)
(52) U.S. Cl.
    USPC .......................................... 370/328
(58) Field of Classification Search
    USPC ......... 370/203, 204–215, 229–253, 310–337, 370/395.3, 395.4, 395.41, 395.42, 395.5, 370/395.52, 431–457, 458–463, 464–497, 370/498–529
    See application file for complete search history.

(56) References Cited

U.S. PATENT DOCUMENTS

| | | | |
|---|---|---|---|
| 7,069,040 B2 | 6/2006 | Iwanaga et al. | |
| 7,394,801 B2 | 7/2008 | Lin | |
| 2004/0023634 A1* | 2/2004 | Jeong et al. | 455/403 |
| 2007/0064642 A1* | 3/2007 | Watabe et al. | 370/324 |
| 2007/0291730 A1* | 12/2007 | Monfet et al. | 370/350 |
| 2008/0101511 A1 | 5/2008 | Lindoff et al. | |
| 2008/0181194 A1* | 7/2008 | Lindoff et al. | 370/350 |
| 2008/0207207 A1 | 8/2008 | Moe et al. | |
| 2008/0232528 A1* | 9/2008 | Imamura et al. | 375/365 |
| 2008/0310525 A1* | 12/2008 | Lin et al. | 375/260 |
| 2009/0047968 A1 | 2/2009 | Gunnarsson et al. | |
| 2009/0086669 A1* | 4/2009 | McCoy et al. | 370/329 |
| 2009/0132674 A1* | 5/2009 | Horn et al. | 709/207 |
| 2009/0132675 A1* | 5/2009 | Horn et al. | 709/207 |
| 2009/0270122 A1* | 10/2009 | Chmiel et al. | 455/550.1 |
| 2010/0093354 A1* | 4/2010 | Agashe et al. | 455/436 |
| 2010/0311346 A1* | 12/2010 | Lindoff et al. | 455/67.11 |

FOREIGN PATENT DOCUMENTS

| | | |
|---|---|---|
| CN | 101175334 A | 5/2008 |
| WO | 2008113373 | 9/2008 |
| WO | 2008125453 A1 | 10/2008 |
| WO | 2009/022974 A1 | 2/2009 |
| WO | 2010/006298 A1 | 1/2010 |

OTHER PUBLICATIONS

Y. Park, and F. Adachi (eds.), "Enhanced Radio Access Technologies for Next Generation Mobile Communication," 2007, excerpt concerning the cell search procedures in Chapter 7 (pp. 253-255), ISBN: 978-1-4020-5531-7.

(Continued)

*Primary Examiner* — Jung-Jen Liu
(74) *Attorney, Agent, or Firm* — Coats and Bennett, P.L.L.C.

(57) ABSTRACT

A cell searching procedure is modified to enable a user terminal to determine whether a detected signal originates in a known cell or a new cell having the same cell identifier as the known cell. When a signal is detected, the user terminal determines the cell identifier and timing of the detected signal. If the cell identifier matches a known cell and the timing is outside the timing window of the known cell, the user terminal compares detected signal with a corresponding received signal received from the known cell having the same cell identifier as the detected signal source. The user terminal determines, based on said comparison, whether the detected signal is from the known cell or a new cell.

24 Claims, 6 Drawing Sheets

(56) References Cited

OTHER PUBLICATIONS

Amirijoo et al., "Neighbor Cell Relation List and Measured Cell Identity Management in LTE," Network Operations and Management Symposium, Apr. 7, 2008, pp. 152-159, IEEE, Piscataway, NJ, US.

Huawei, "Detection of Conflicting Cell Identities," 3GPP TSG RAN WG3 Meeting #57bis, Oct. 8-11, 2007, pp. 1-3, 3rd Generation Partnership Project (3GPP), Sophia-Antipolis Cedex, France.

Ericsson, "MCI Conflict Detection and Resolution," 3GPP TSG-SA5 (Telecom Management), Meeting SA5#55, Aug. 27-31, 2007, pp. 1-4, 3rd Generation Partnership Project (3GPP), Sophia-Antipolis Cedex, France.

Nokia Siemens Networks, "Automatic Physical Cell ID Assignment," 3GPP TSG-SA5 (Telecom Management), Meeting SA5#60, Jul. 7-11, 2008, pp. 1-4, 3rd Generation Partnership Project (3GPP), Sophia-Antipolis Cedex, France.

Amirijoo et al, "Neighbor Cell Relation List and Physical Cell Identity Self-Organization in LTE," Wireless Access Networks, Ericsson Research, Ericsson AB, Sweden, 978-1-4244-2052-0/08, 2008 IEEE, pp. 37-41.

Feng, et al., "Self-Organizing Networks (SON) in 3GPP Long Term Evolution," Nomor Research GmbH, Munich, Germany, May 20, 2008, 15 pages.

R3-080812, Nokia Siemens Networks, Nokia, Solution(s) to the 36.902's Automated Configuration of Physical Cell Identity Use Case, 3GPP TSG-RAN WG3 Meeting #59-bis, Shenzen, China, Mar. 31-Apr. 3, 2008, 7 pages.

* cited by examiner

METHOD AND APPARATUS FOR CELL SEARCHING

BACKGROUND

The present invention relates generally to cell searching in a mobile communication network and, more particularly, to methods and apparatus for identifying sources of signals during cell searching.

In a conventional mobile communication network, the coverage of the network area is divided into a plurality of cells. A base station with a centrally-located antenna provides service to user terminals within the cell. Each cell is identified by a unique cell ID, which is broadcast to the user terminals over a broadcast channel. The cell ID enables the user terminals to differentiate between different cells when implementing cell search algorithms for mobility management purposes.

A distributed antenna system (DAS) has been proposed for the Long Term Evolution (LTE) standard being developed by the 3rd Generation Partnership Project (3GPP). In a distributed antenna system, the base station connects to multiple antennas that provide coverage to user terminals within a cell. The area covered by each antenna, referred to herein as a subcell, is generally much smaller than that of a centrally-located antenna in a conventional mobile communication system. The distributed antenna system architecture has two main advantages. First, it is possible to achieve a high spatial re-use factor due to the small coverage area of each antenna. Second, the single base station has control over all of the radio resources used at each antenna and can therefore coordinate the transmission and reception of signals to minimize interference and increase system capacity.

Cell planning errors may result in two adjacent cells have the same cell ID, which is not desirable. For example, two different cells having the same cell ID may cause confusion in user terminals in systems that use distributed antenna systems. In this case, the user terminal may erroneously assume that a signal received from an antenna in an adjacent cell is from an antenna in a current serving cell. Mistakes of this nature could result in mobility management errors.

Accordingly, there is a need for a way to determine whether a detected signal originates in a known cell or a new cell having the same cell identifier as the known when cell planning errors occur.

SUMMARY

The present invention provides a method and apparatus for determining whether a detected signal originates in a known cell or a new cell having the same identifier as the known cell. When a user terminal operating in a mobile communication network detects a new signal, the user terminal determines the cell identifier and frame timing of the detected signal. If the detected signal has the same cell ID as a known cell, but with a different time delay, the detected signal source could be from either a known cell, or a new cell. In this case, the user terminal compares the detected signal with corresponding signals received from the known cell having the same cell identifier as the detected signal source but with a different timing. For example, the user terminal may compare data and/or control symbols transmitted in the detected signal with corresponding data symbols and/or control signals transmitted in a signal from a known cell. Based on a comparison with the signal received from the known cell, the user terminal determines whether the detected signal originates in the known cell or a new cell. It will be appreciated that the new cell may comprise a cell with a single, centrally located antenna, or a distributed antenna system. If the detected signal matches a corresponding signal received from the known cell, it is determined that the detected signal originates in the known cell. Conversely, if the detected signal does not match the signal received from the known cell, it is determined that the detected signal originates in a new cell with the same cell identifier. In this case, the user terminal may determine that a cell planning error has occurred and report the cell planning error to the network.

DETAILED DESCRIPTION

Figure 1:
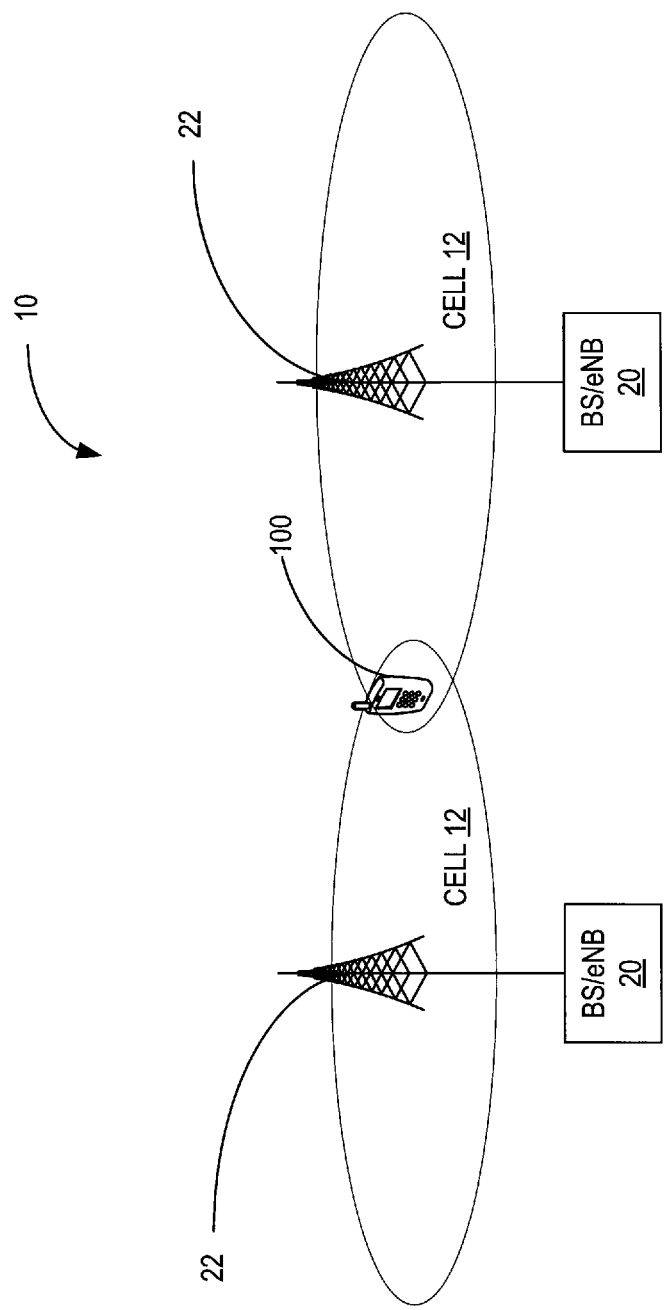
FIG. 1 illustrates an exemplary mobile communication network having a centralized antenna for each cell.

Referring now to the drawings, the present invention will be described in the context of a mobile communication network configured according to the Long Term Evolution (LTE) standards currently being developed by the 3rd Generation Partnership Project (3GPP). Those skilled in the art will appreciate, however, that the present invention may be implemented in mobile communication networks operating according to other standards, such as the Wideband Code Division Multiple Access (WCDMA) and WiMax standards.

FIG. 1 illustrates a conventional network architecture for a mobile communication network indicated generally by the numeral 10. The coverage area of the mobile communication network 10 is divided into a plurality of cells 12. A base station 20 associated with each cell 12, referred to as an enhanced Node B (eNB) in the LTE standard, provides service to user terminals 100 within the cell 12. Typically, a separate base station 20 is provided for each cell 12. The base station 20 typically connects to one or more antennas 22 that are centrally located within the cell 12.

In a mobile communication network 10, a hand-over procedure is used to ensure continuity of service as user terminal 100 moves between cells 12 in the mobile communication network 10. The user terminal 100 periodically searches for neighboring cells 12, measures the strength of signals received from the serving cell 12 and neighboring cells 12, and reports the signal strength measurements to the serving base station 20. The base station 20, or user terminal 100, determines when to execute the handover based on the signal strength measurements. Typically, a handover is executed when the signal strength from a neighboring cell 12 becomes greater than the signal strength from the serving cell 12.

To facilitate mobility management, each cell 12 in the mobile communication network 10 is identified by a cell ID. User terminal 100 searches for and reports new cells 12 to the current serving cell 12 while it is operating. When user terminal 100 detects a new cell 12, the user terminal 100 adds the detected cell 12 to a list of known cells 12 that are being monitored by the user terminal 100.

Figure 2:
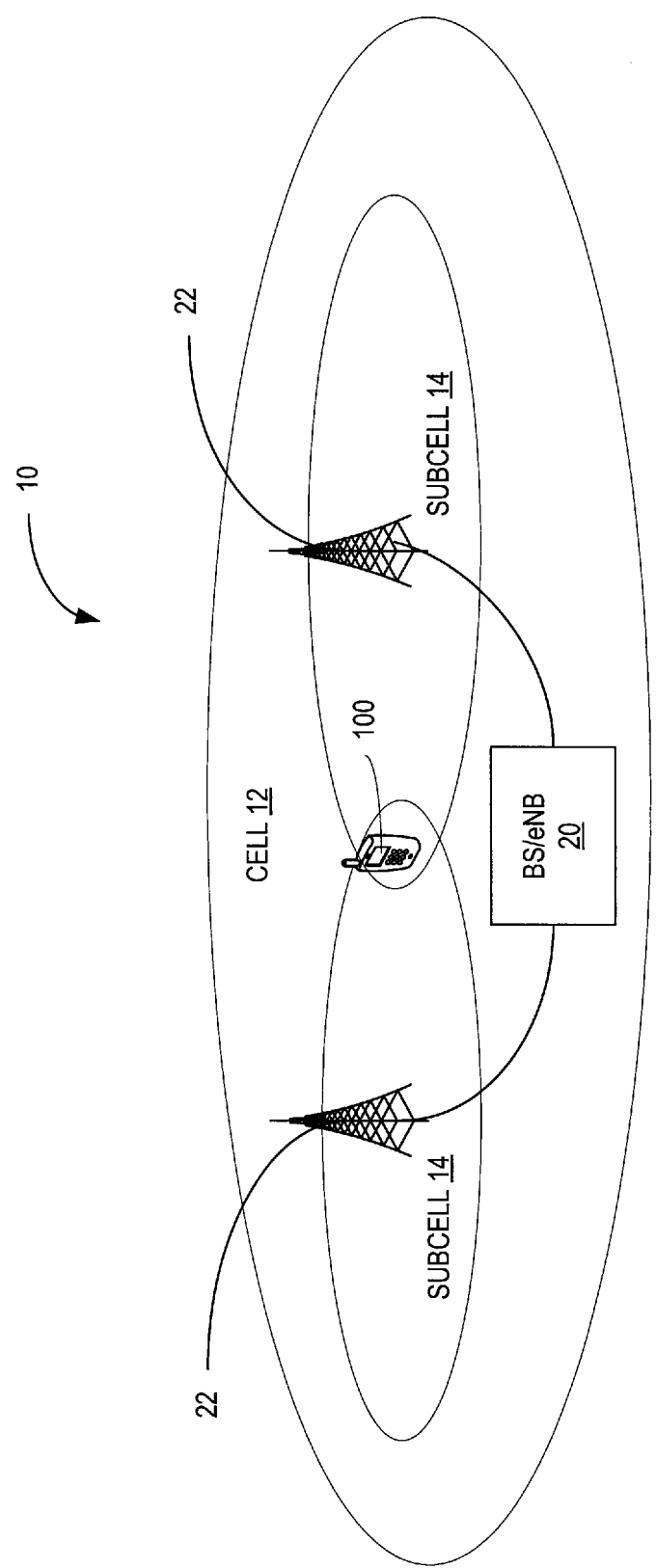
FIG. 2 illustrates an exemplary mobile communication system using a distributed antenna system.

FIG. 2 illustrates an alternative network architecture that is proposed for LTE networks. As in a conventional mobile communication network 10, the coverage area of the mobile communication network 10 is divided into a plurality of cells 12. Only one cell 12 is shown in FIG. 2. A base station 20 provides service to the user terminals 100 within each cell 12. Base station 20 connects to a plurality of antennas 22 that are distributed throughout the cell 12. The radiation coverage area of the antennas 22, referred to herein as a subcell 14, is smaller than the coverage area of the cell 12. The base station 20 has complete control over the resources allocated at each antenna 22 and may transmit information to the user terminal 100 from multiple antennas 22. Thus, the user terminal 100 may receive the same information from multiple antennas 22, albeit with different time delays. Because each antenna 22 is within the same cell 12, the same cell ID is broadcast by each antenna 22.

When a user terminal 100 is operating within a cell 12 having multiple antennas 22, the user terminal 100 reports the signal strength from each detected antenna 22 to the base station 20. The cell search algorithms of the user terminal 100 may be modified to search for signal sources, which may be antennas 22 within the same cell 12 or antennas 22 within a neighboring cell 12. Signals from different antennas may be detected for example based on different time delays. The antennas 22 for transmitting signals to a user terminal 100 are selected based on the signal strength measurements provided by the user terminal 100. Base station 20 can coordinate transmission and reception of signals from multiple antennas 22 to minimize interference. In other embodiments, the user terminal 100 may report the total strength of the signal received from all antennas 22 in the known cell 12.

In a distributed antenna system, problems may arise if adjacent cells 12 in the mobile communication system 10 are assigned the same cell ID. While not desirable, this situation is known to occur when new systems are being deployed. When two adjacent cells 12 have the same cell ID, a user terminal 100 may have difficulty determining the origin of the signal and may mistakenly assume that a signal received from an antenna 22 in an adjacent cell 12 originates in the current serving cell 12. In this case, user terminal 100 may fail to execute a handover when needed or may request a handover to a cell 12 that cannot be identified, resulting in a dropped call. There are several reasons why a user terminal may receive signals with different timing from a known cell 12. The known cell 12 may have multiple antennas 22 at different distances from the user terminal. Also, different multipaths of a signal may arrive at the user terminal at different times.

Figure 3:
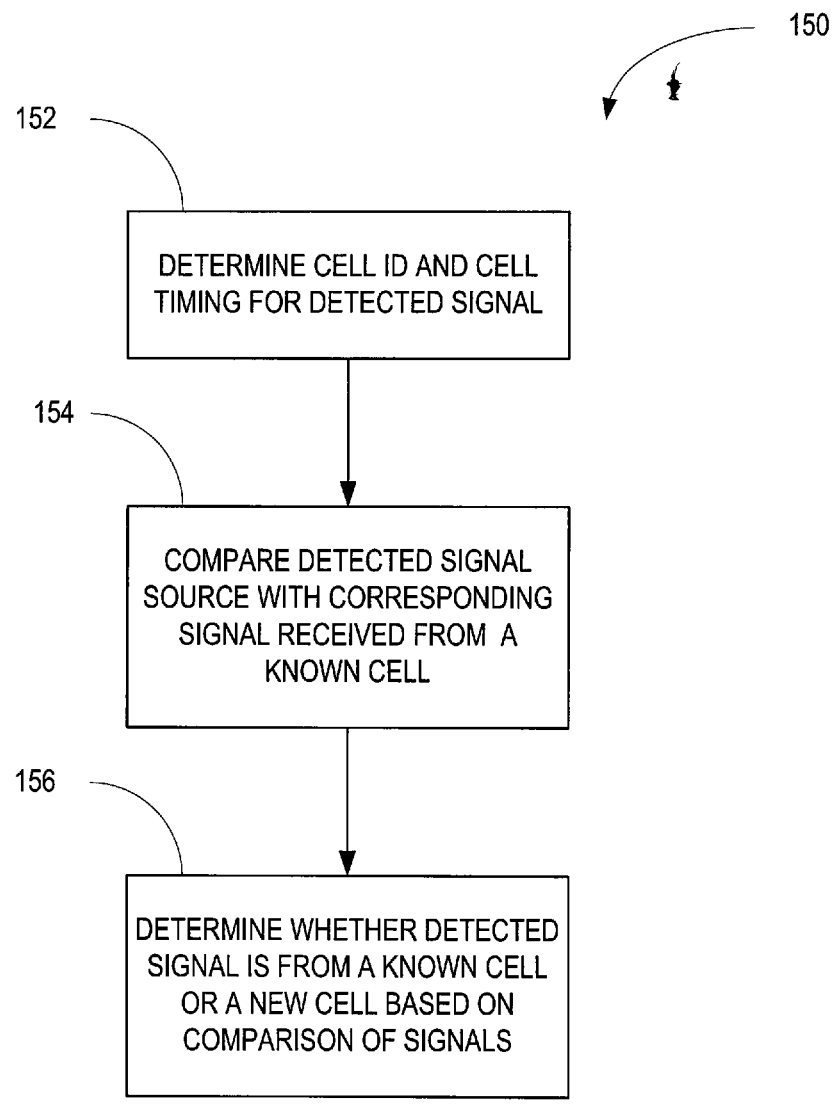
FIG. 3 illustrates an exemplary method for determining the origin of a detected signal.

According to one embodiment of the present invention, a procedure is provided to enable the user terminal 100 to determine whether a detected signal originates in a known cell 12 or an unknown cell having the same cell identifier as the known cell. FIG. 3 illustrates one exemplary method 150 according to the present invention and implemented by the user terminal 100. Upon detection of a new signal, i.e., an antenna 22, user terminal 100 determines a cell ID and timing of the detected signal (block 152). If the cell ID matches a known cell and the timing t1 is within the timing window (a window surrounding t0) of a known cell 12, the search continues normally. If the cell ID matches the cell ID of a known cell 12, but is outside the timing window for the known cell 12, the user terminal 100 determines whether the new signal source originates in the known cell 12 or a new cell 12 not previously known to the user terminal 100. It will be appreciated that the new cell 12 may include a single, centrally located antenna 22, or a distributed antenna system with one antenna 22 in each subcell 14. In order to determine whether the detected signal originates in the known cell 12 or a new cell 12, user terminal 100 compares the detected signal with a corresponding received signal received from a known cell 12 (block 154). Based on the comparison, the user terminal 100 determines whether the detected signal source originates in a known cell 12 or a new cell 12 (block 156).

The detected signal can be compared with the received signal from a known source in several ways. For example, user terminal 100 may correlate OFDM symbols in the detected signal with corresponding OFDM symbols in the received signal. The user terminal 100 performs an FFT on the detected signal at a timing t1 and on the received signal at a corresponding timing t0. The OFDM symbols from the detected signal may then be correlated with corresponding OFDM symbols from the received signal. If there is a high correlation, it is likely that the detected signal originates in the known cell 12. If the correlation is low, it is likely that the detected signal originates from a new cell 12. Therefore, a decision can be made by comparing the correlation result with a pre-determined threshold. Due to intersymbol interference (ISI), the correlation result is likely to include a large amount of noise. The threshold may, therefore, be determined by estimating the signal-to-noise ratio for the respective signals.

In another embodiment, control signals in the detected signal can be compared with control signal transmitted by the known cell 12. The detected signal and the received signal may be decoded to obtain control signals from each for comparison. If the control signal in the detected signal matches the control signal received from a known cell 12, then user terminal 100 determines that the detected signal originates in the known cell 12. Conversely, if different control information in the detected signal is different, the user terminal determines that the detected signal originates in a new cell 12, and adds the new cell 12 to a new cell list.

Figure 4A:
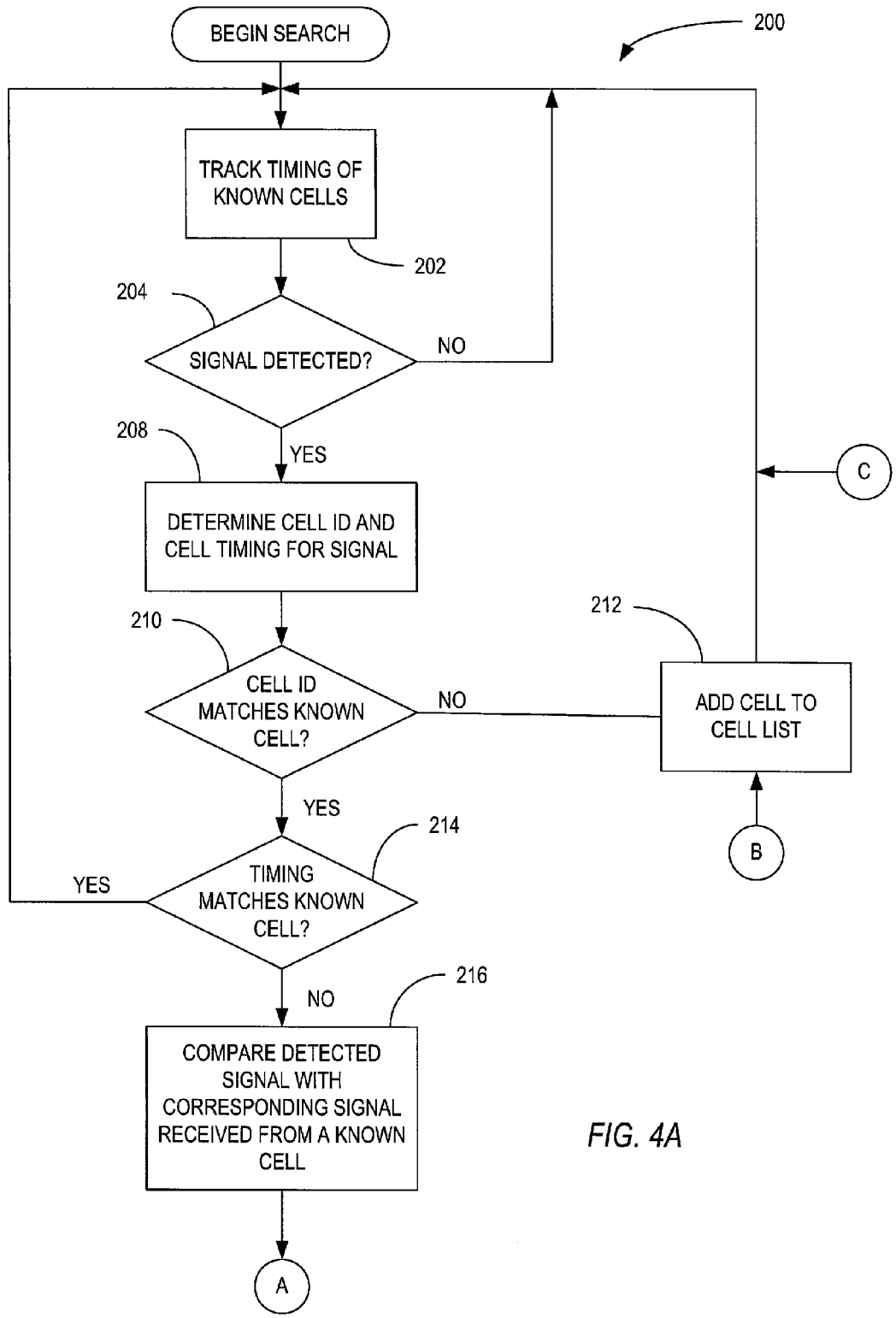
FIGS. 4A and 4B illustrate a search procedure that incorporates the method of FIG. 3.
Figure 4B:
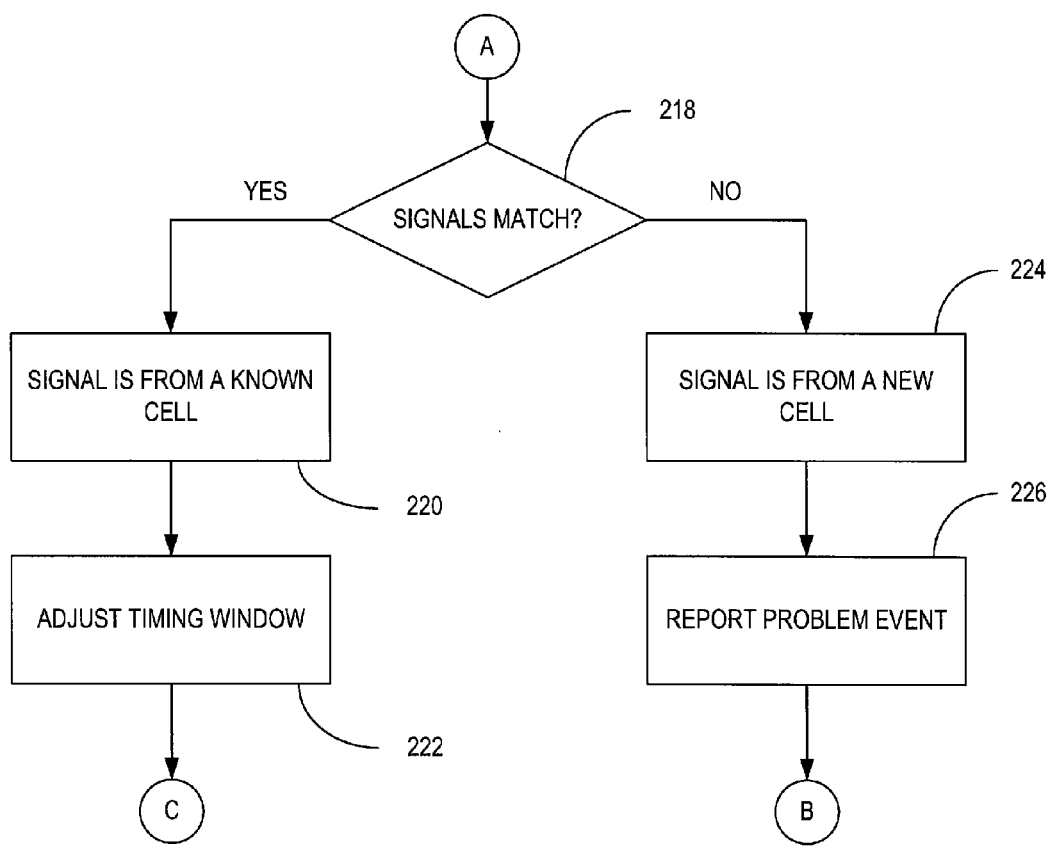

FIGS. 4A and 4B illustrate an exemplary search method 200 implemented by a user terminal 100 that incorporates the method shown in FIG. 3. The user terminal 100 continuously tracks the timing of known cells 12 (block 202). The timing of the known cells 12 may be tracked, for example, by correlating to the synchronization symbols transmitted on the primary synchronization channel (P-SCH) and/or secondary synchronization channel (S-SCH) transmitted at regular intervals in LTE networks. Each cell 12 has an allowed timing window during which multipath components may be received. Typically, the timing window is the same length or slightly larger than the cyclic prefix used in LTE.

The user terminal 100 also periodically searches for new signal sources (block 204). Cell searching algorithms are well known in the art and are therefore described only briefly herein. To assist the user terminal 100, each cell 12 provides a primary synchronization signal and a secondary synchronization signal on the downlink. During an initial step of the cell search procedure, user terminal 100 performs match filtering between the received signal and the known primary synchronization sequences. Peaks in the output of the matched filter indicate the presence of a signal source and provide course timing. Once the course timing is acquired, the user terminal 100 correlates to the secondary synchronization signal to acquire the frame timing and cell ID.

When a new signal is detected, user terminal 100 determines the cell ID and timing delay of the detected signal (block 208). Those skilled in the art will appreciate that the cell ID and timing are acquired from the primary synchronization and secondary synchronization signals. The cell ID of the signal is checked against a list of known cells which is stored by the user terminal 100 (block 210). If the cell ID is not included in the known cell list, the signal is assumed to be from a new cell 12, which is added to a known cell list (block 212), and the process continues. If the cell ID of the detected signal matches the cell ID of a known cell 12, the timing of the detected signal is compared to the timing of the known cells (block 214). If the timing of the detected signal falls within the timing window of a known cell 12, it is assumed that the detected signal is from a known cell 12 and the process continues.

If the timing of the detected signal source falls outside the timing window of the known cells 12 having the same cell ID, the user terminal 100 compares the detected signal with corresponding signals received from the known cell 12 as previously described (block 216). If the signals match (block 218), it is determined that the detected signal source is from a known cell 12 (block 220). In this case, the user terminal 100 adjusts the timing window for the known cell 12 (block 222). If the signals received from the detected signal source do not match the signals received from the known cell 12 with the same cell ID (block 218), it is determined that the detected signal is from a new cell (block 224). Because this situation typically means that two adjacent cells share the same cell ID, the user terminal 100 may optionally report a problem event to the network 10 (block 226) and then add the detected signal source to a known cell list (block 212).

As noted previously, the present invention is not limited to LTE networks but may also be used in networks implementing other communication standards, such as WCDMA systems. In WCDMA systems, comparison of signals from the detected signal source and a known cell can be done by despreading the received signals at a time instant corresponding to the detected timing t1 and correlating the despread signals from the detected signal source with the despread signals from the known cell, despread at a time instant corresponding to the known cell timing t0. The user terminal 100 can then compare the correlation result with a threshold as previously described. Alternatively, user terminal 100 could decode the signals and compare the decoded symbols.

Figure 5:
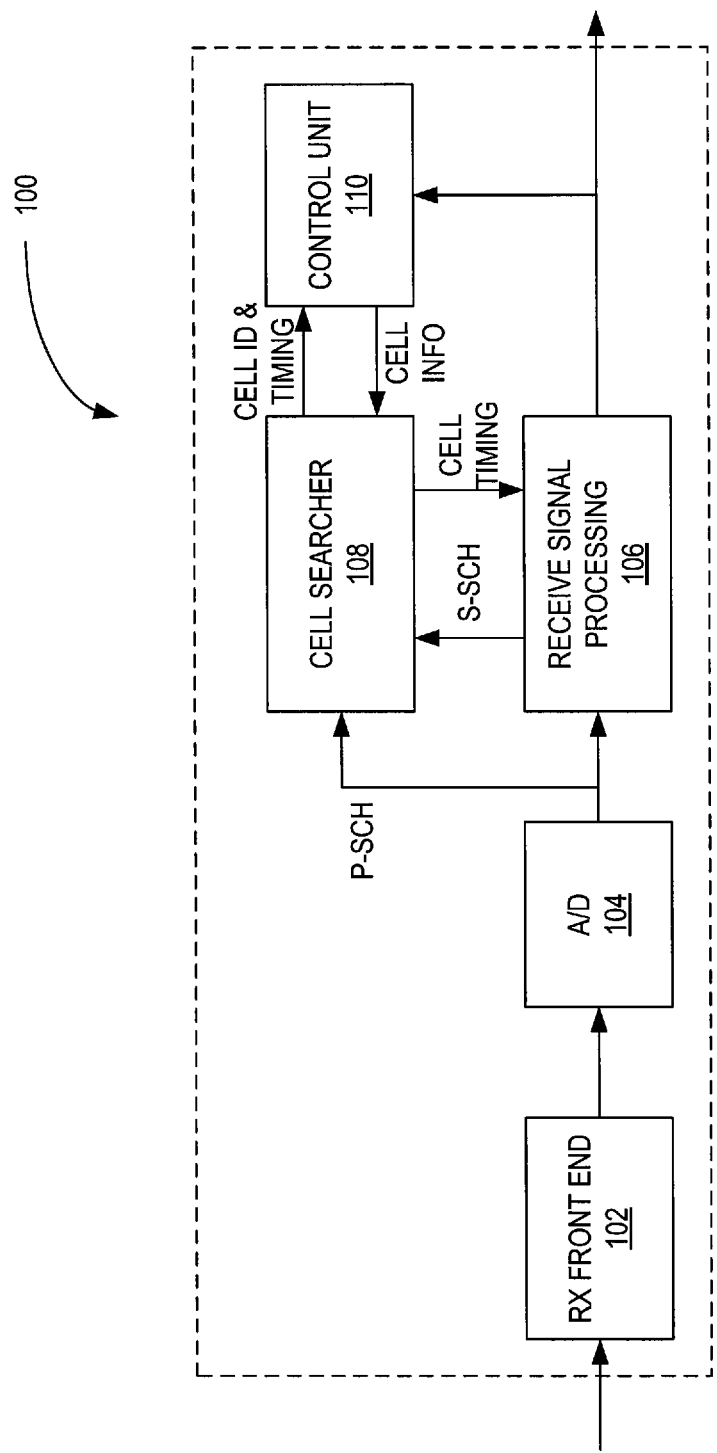
FIG. 5 illustrates an exemplary user terminal according to the present invention.

FIG. 5 illustrates an exemplary user terminal 100 according to one embodiment of the present invention. User terminal 100 comprises a receiver front end 102, analog-to-digital converter 104, receive signal processor 106, cell searcher 108, and control unit 110. Receiver front end 102 amplifies, filters, and downconverts received signals to baseband frequency. Analog-to-digital converter 104 samples the received signals and converts the received signals into digital samples for input to the receive signal processor 106. Receive signal processor 106 processes the received signals in a known manner. Such processing includes demodulation and decoding. Cell searcher 108 provides timing for known cells 12 to the receive signal processor 106. The receive signal processor 106 FFT processes the secondary synchronization channel (S-SCH) and provides the output to the cell searcher 108.

The primary function of cell searcher 108 is to detect new cells 12. The cell searcher 108 provides the cell IDs and timing for detecting signals to the control unit 110. Control unit 110 compares the cell IDs to a list of known cells 12. If the cell ID does not match a known cell 12, the control unit 110 adds the cell ID to the known cell list, which is stored in memory of the user terminal 100 (not shown). If the cell ID matches a known cell 12, control unit 100 determines whether the detected signal is from a known cell 12 or a new cell 12. This determination is made as previously described by comparing data and/or control signals in the detected signal with corresponding data and control signals in a received signal transmitted by a known cell 12.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of discriminating between a subcell of a known cell and a new cell having the same cell identifier as the known cell, said method comprising:
   determining the cell identifier and timing of a detected signal;
   comparing the cell identifier of the detected signal with a list of known-cell identifiers;
   if the cell identifier of the detected signal is the same as a cell identifier of the known cell but with a different timing, comparing a selected portion of the detected signal with a corresponding portion of a received signal received from the known cell, wherein the selected portion facilitates discriminating between signals from a subcell of the known cell and the new cell; and
   determining, based on said comparison, whether the detected signal originates in the known cell or the new cell.

2. The method of claim 1 wherein the detected signal and the received signal comprise one or more OFDM symbols.

3. The method of claim 2 wherein comparing the detected signal with a corresponding received signal received from the known cell comprises transforming the detected signal and the received signal to obtain the OFDM symbols and comparing the OFDM symbols.

4. The method of claim 1 wherein the detected signal and the received signal comprise CDMA signals.

5. The method of claim 4 wherein comparing the detected signal with a corresponding received signal received from the known cell comprises despreading the detected signal and the received signal and comparing the despread signals.

6. The method according to claim 1 wherein comparing the detected signal with a corresponding received signal received from said known cell comprises comparing data and/or control signals in the detected signal with corresponding data and/or control signals in the received signal.

7. The method of claim 6 wherein comparing the detected signal with a corresponding received signal received from a known cell comprises comparing decoded data and/or control signals in the detected signal source with decoded data and/or control signals received from the known cell.

8. The method of claim 6 wherein comparing the detected signal with a corresponding received signal received from a known cell comprises correlating undecoded data and/or control signals received from the detected signal source with undecoded data and/or control signals received from the known cell.

9. The method according to claim 1 further comprising adjusting a timing window for the known cell if the detected signal is determined to be a from a known cell.

10. The method of claim 9 wherein the timing window comprises a cell search timing window.

11. The method of claim 9 wherein the timing window comprises a path search timing window.

12. The method according to claim 1 further comprising reporting a problem event to a designated network entity if the detected signal is determined to be from a new cell.

13. A user terminal in a mobile communication network, said user terminal comprising:
   a receiver to receive signals from one or more signal sources in said mobile communication network;
   a searcher for detecting a signal from a signal source within the mobile communication network and for determining a cell identifier and timing of a detected signal; and
   a control unit configured to:

compare the cell identifier of the detected signal with a list of known-cell identifiers;

if the cell identifier of the detected signal is the same as a cell identifier of a known cell but with a different timing, compare a selected portion of the detected signal with a corresponding option of a received signal received from the known cell, wherein the selected portion facilitates discriminating between signals from a subcell of the known cell and the new cell; and determine, based on said comparison, whether the detected signal originates in a known cell or a new cell.

14. The user terminal of claim 13 wherein the detected signal and the received signal comprise one or more OFDM symbols, and wherein the user terminal further comprises a received signal processor for transforming the detected signal and the received signal to obtain said OFDM symbols.

15. The user terminal of claim 14 wherein the control unit is configured to compare the OFDM symbols in both the detected signal and the received signal.

16. The user terminal of claim 13 wherein the detected signal and the received signal comprise CDMA signals, and wherein the user terminal further comprises a received signal processor for despreading the detected signal and the received signal to generate despread signals.

17. The user terminal of claim 16 wherein the control unit is configured to compare the despread signals.

18. The user terminal according to claim 13 wherein the control unit is configured to compare data and/or control signals in the detected signal with corresponding data and/or control signal in the received signal.

19. The user terminal of claim 18 wherein the control unit is configured to compare decoded data and/or control signals in the detected signal with decoded data and/or control signals in the received signal, and wherein the user terminal further includes a processor to decode the detected signal and the received signal.

20. The user terminal of claim 18 wherein the control unit is configured to correlate undecoded data and/or control signals in the detected signal with undecoded data and/or control signals in the received signal.

21. The user terminal according to claim 13 wherein the control unit is further configured to adjust a timing window for the known cell if the detected signal source is determined to be from a known cell.

22. The user terminal of claim 21 wherein the timing window comprises a cell search timing window.

23. The user terminal of claim 21 wherein the timing window comprises a path search timing window.

24. The user terminal according to claim 13 wherein the control unit is further configured to report a problem event to a designated network entity if the detected signal is determined to be from a new cell.

* * * * *

UNITED STATES PATENT AND TRADEMARK OFFICE
CERTIFICATE OF CORRECTION

PATENT NO.        : 8,705,440 B2
APPLICATION NO.   : 12/354052
DATED             : April 22, 2014
INVENTOR(S)       : Lindoff et al.

Page 1 of 1

It is certified that error appears in the above-identified patent and that said Letters Patent is hereby corrected as shown below:

In the Specification

In Column 5, Line 57, delete "unit 100" and insert -- unit 110 --, therefor.

Signed and Sealed this
Second Day of September, 2014

Michelle K. Lee
*Deputy Director of the United States Patent and Trademark Office*